US009424504B2

(12) United States Patent
Annamalai et al.

(10) Patent No.: US 9,424,504 B2
(45) Date of Patent: Aug. 23, 2016

(54) COMBINING A QR CODE AND AN IMAGE

(71) Applicant: PayPal, Inc., San Jose, CA (US)

(72) Inventors: Prasanna Annamalai, Tamil Nadu (IN); Tushar Raibhandare, Tamil Nadu (IN)

(73) Assignee: PAYPAL, INC., San Jose, CA (US)

( * ) Notice: Subject to any disclaimer, the term of this patent is extended or adjusted under 35 U.S.C. 154(b) by 19 days.

(21) Appl. No.: 14/486,272

(22) Filed: Sep. 15, 2014

(65) Prior Publication Data

US 2016/0078335 A1    Mar. 17, 2016

(51) Int. Cl.
*G06K 9/36* (2006.01)
*G06K 19/06* (2006.01)
*G06T 11/60* (2006.01)
*G06T 7/00* (2006.01)

(52) U.S. Cl.
CPC ....... *G06K 19/06103* (2013.01); *G06T 7/0028* (2013.01); *G06T 11/60* (2013.01)

(58) Field of Classification Search
None
See application file for complete search history.

(56) References Cited

U.S. PATENT DOCUMENTS

| 7,913,922 | B1 | 3/2011 | Roth |
| 2006/0215931 | A1 | 9/2006 | Shimomukai |
| 2010/0155464 | A1 | 6/2010 | Swayn et al. |
| 2013/0100354 | A1 | 4/2013 | Kim |
| 2013/0112760 | A1 | 5/2013 | Schory et al. |
| 2013/0221105 | A1 | 8/2013 | Cheong et al. |
| 2015/0339838 | A1* | 11/2015 | Friedman et al. ............ 345/641 |

FOREIGN PATENT DOCUMENTS

JP          5187383          4/2013

OTHER PUBLICATIONS

ImageMagick.org, http://www.imagemagick.org/discourse-server/viewtopic.php?t=18815, 2011.*

* cited by examiner

*Primary Examiner* — Andrew Moyer
(74) *Attorney, Agent, or Firm* — Haynes and Boone, LLP

(57) ABSTRACT

A QR code is combined with a base image, preserving useful functionalities of both the base image and the QR code. For example, the base image remains clearly visible and recognizable by humans; the transparent QR code remains readable by scanners; machine image search can distinguish the base image from the combined image; and faces of the combined image are usable by machine face recognition programs. A QR code is generated with transparencies for different regions. An inner portion and outer shell portion for each module each may have different transparencies. Inner portion size relative to outer shell size is selectively adjustable. The generated QR code image may be combined with a given base image such as a face or company logo using the transparency values of the QR code image to make the two images appear as overlaid on one another with varying degrees of transparency.

14 Claims, 7 Drawing Sheets

COMBINING A QR CODE AND AN IMAGE

BACKGROUND

1. Field of the Invention

Embodiments of the present disclosure generally relate to the use of QR (quick response) codes and, more particularly, to combining a QR code and an image so that both the QR code and the image retain useful functionality.

2. Related Art

QR codes, designed for tracking parts in vehicle manufacturing, have become ubiquitous on account of the wide range of applications that have been found for them, including advertising, commercial tracking, entertainment and transport ticketing, product-loyalty marketing (e.g., QR codes used for coupons that can be redeemed using a mobile app for QR code decoding), and in-store product labeling as well as on account of their fast readability and greater storage capacity compared to the older UPC bar codes. Many applications (apps) are now available enabling, for example, a smartphone to be used as a QR code scanner that displays the QR code and converts it to some useful form (such as a standard uniform resource locator (URL) for a website, so that a user does not have to type the URL into a web browser to go to the site).

To illustrate a few examples of the use of such apps, users may receive text, add a vCard contact to their device, open a uniform resource identifier (URI), or compose an e-mail or text message after scanning QR codes. Users can generate and print their own QR codes for others to scan and use by visiting or using one of several pay or free QR code-generating sites or apps. Apps for scanning QR codes can be found on nearly all smartphone devices. QR codes storing information such as addresses and URLs appear in magazines, on signs, on buses, on business cards, and on almost any object about which users might want information. Users with a camera phone equipped with a QR scanner application can scan the image of the QR code to display text or contact information, connect to a wireless network, or open a web page in the telephone's browser.

In the shopping industry, the QR code has become a focus of advertising strategy, since, for example, it may provide quick and effortless access to a brand's website or other direct access to information wished to be shared by an advertiser. Beyond mere convenience to the consumer, one importance of this capability is that advertisers and marketers can use the behavior of scanning to encourage or aid consumers to buy their products, causing the use of QR codes to have a significant impact on advertising and marketing design. One example of such impact is an increase in what is known as conversion rate, e.g., the chance that contact with an advertisement will convert to a sale. Thus, improvements in the use of QR codes can have a beneficial effect on commerce and the economy.

Figure 1A:
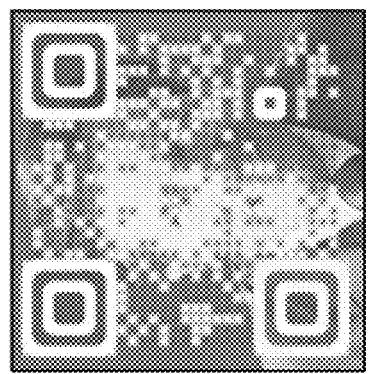
FIGS. 1A and 1B provide prior art examples of overlaying a QR code on a background image of a face.

Embodiments of the present disclosure and their advantages are best understood by referring to the detailed description that follows. It should be appreciated that like reference numerals are used to identify like elements illustrated in one or more of the figures, in which the showings therein are for purposes of illustrating the embodiments and not for purposes of limiting them.

DETAILED DESCRIPTION

Figure 1B:
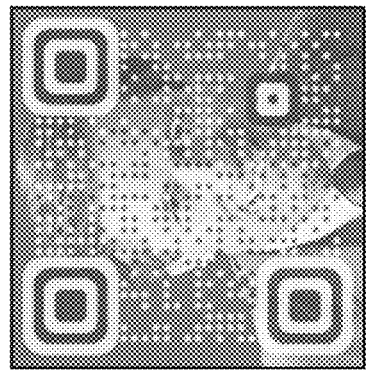
Figure 1C:
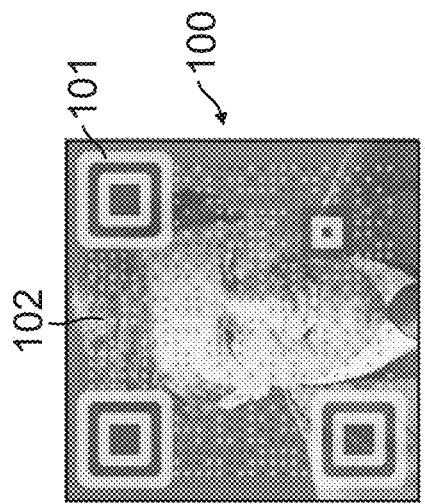
FIG. 1C shows an example of combining a QR code image and an image of the same face in accordance with an embodiment of the disclosure.
Figure 2A:
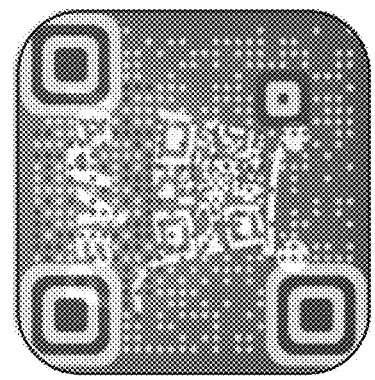
FIGS. 2A and 2B provide prior art examples of overlaying a QR code on a background image of a company logo.
Figure 2B:
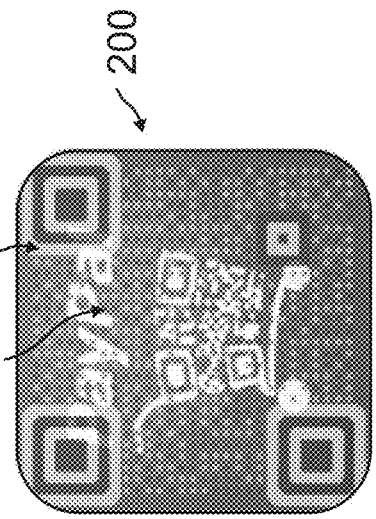

In accordance with one or more embodiments of the present disclosure, systems and methods are disclosed for combining a QR code image with another image that can significantly improve the quality of the result of overlaying a QR code on a background image. Prior art methods of overlaying a QR code on an image generally produce an image in which the features of the original image are not clearly evident to humans, as well as not recognizable by machines (as in, for example, image searching). Prior art examples of a QR code overlaid on a background image of a person's face are shown in FIGS. 1A and 1B. Prior art examples of a QR code overlaid on a background image of a company logo are shown in FIGS. 2A and 2B. FIG. 1C, by way of comparison, shows an example of a QR code 101 combined, in accordance with an embodiment, with an image 102 of a face (e.g., the same face as in FIGS. 1A and 1B) to form a combined QR code-base image 100. Also, FIG. 2C, by way of comparison, shows an example of a QR code 201 combined, in accordance with an embodiment, with an image 202 of a company logo (e.g., the same as shown in FIGS. 2A and 2B) to form a combined QR code-base image 200.

Figure 2C:
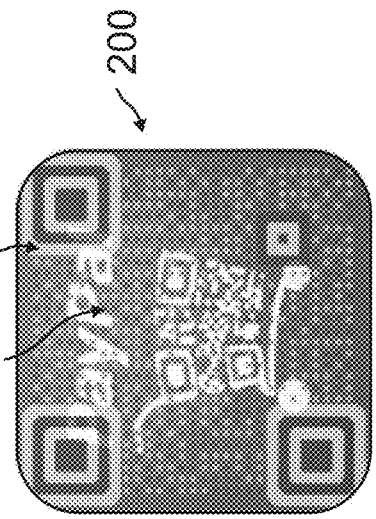
FIG. 2C shows an example of combining a QR code image and an image of the same company logo in accordance with an embodiment.

As shown in FIGS. 1C and 2C, images of a QR code combined with a background or base image (e.g., person's face or company logo) produced in accordance with one or more embodiments may exhibit a number of desirable properties and preserve several useful functionalities of both the base image and the QR code, including:

a) the base image remains clearly visible and easily recognizable by humans;

b) even though the QR code is transparent, it is readable by QR code scanners;

c) machine image search (e.g., Google image search) is able to identify the original (base) image from the combined QR code-base image; and d) the combined QR code-base image face (e.g., FIG. 1C) can also be used by face recognition programs.

One or more embodiments may enable several business and other utilitarian uses for combined QR code-base images. For example, in a pay code product—such as one provided by PayPal, Inc. of San Jose, Calif.—the base image can be an image of the consumer so that a merchant can visually identify the consumer by face and as well as make payments through a machine by reading the QR code.

In another example, combined QR code-base images can enable search engine optimization and better image recognition. For example, the method of combining a QR code with a base image according to one embodiment may serve as a rich search engine optimization parameter in organic searches (despite absence of any meta tags on the image, such as may be found in a magazine advertisement). As an illustration, assume a well-known shoe manufacturer has an ad of their shoes in a sports magazine. If an image of the shoes appearing in the ad is combined with a QR code using the method of combining a QR code with a base image according to one embodiment, the magazine reader (user) can use the user's mobile app (e.g., RedLaser® or eBay app) to do a more accurate image search on eBay, and the app can navigate the user to a search results page on eBay.com listing the products that match that image. The output of the image matching may be enhanced because the image beneath the QR code can be clearer using the combined QR code-base image provided according to an embodiment. The QR code that is overlaid may not cause so much distortion that can disrupt or degrade the results of an image search. Such clearer base images in combined QR code-base images can encourage merchants to adopt QR code more in their product listings, thereby increasing the use of scanning apps such as RedLaser. Similarly, use of QR codes for promulgating the URL of the website of a company in the form of a QR code combined with a base image of the company logo can benefit from the combined QR code-base image according to one or more embodiments.

In one embodiment, a method for authentication of a payment card or device and authorization of a transaction may include visual identification (e.g., by a merchant) of a consumer using a QR code overlaid on an image of the consumer's face so that the merchant can visually identify the consumer by face and as well as make payments through a machine by reading the QR code.

In another embodiment, a method for image searching may include machine searching images overlaid with QR codes in accordance with one or more embodiments. The output of the image matching may be enhanced because the image beneath the QR code may be clearer. The QR code that is overlaid would not be a distortion that degrades the results of image searches.

In one or more embodiments, merchants may adopt QR codes more frequently in their product listings, thereby increasing the adoption of scanning apps that can do machine image searches and read QR codes.

In one or more embodiments, businesses may overlay the URL of the website of the company, in the form of a QR code, on an image of the company's logo.

Figure 3:
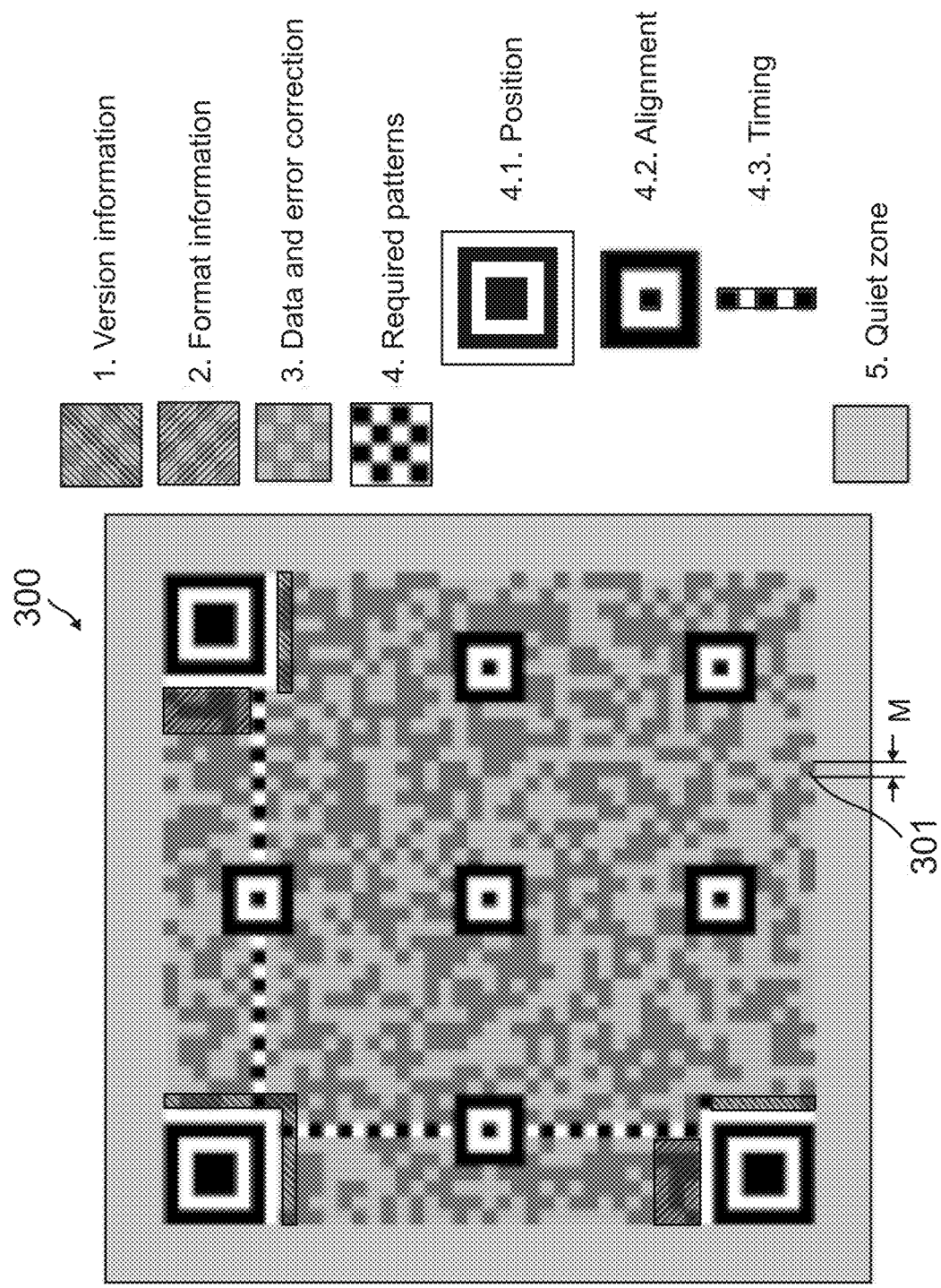
FIG. 3 is a diagram of a QR code showing various regions of the QR code and their functions, in accordance with one or more embodiments.

FIG. 3 shows a diagram of a QR code showing various regions (according to various hatchings and shadings) of the QR code and their functions, in accordance with one or more embodiments. As seen in FIG. 3, QR code 300 may be composed of dark or light modules—such as module 301—which may resemble square dots arranged in a square grid, which can be read by an imaging device (such as a camera) and processed using Reed-Solomon error correction until the image can be appropriately interpreted. The number of modules in a QR code depends on its version, with version 1 having 21×21 modules and version 40 having 177×177 modules.

The area of the QR code may be divided into different types of patterns, as shown by the various shadings and cross hatchings seen in FIG. 3 and indicated by the legend accompanying FIG. 3. Thus each module may be allocated to or belong to a particular region. Various types of regions are indicated by the legend of FIG. 3 which accompanies the QR code example of FIG. 3 and the matching cross hatchings and shadings of the QR code example.

Version (legend item 1. of FIG. 3) refers to the number of modules comprising the QR code and can range from 1 to 40, with version 1 having 21×21 modules and version 40 having 177×177 modules. Format (legend item 2.) information may record the error correction level and the mask pattern used for the QR code modules. Reed-Solomon error correction may be implemented, for example, at one of four levels. The higher the error correction level, the less is the data storage capacity for a given version, but the higher is the robustness or reliability of reading the data from the QR code. Error correction levels are designated as L (low, 7% of codewords can be restored), M (medium, 15% of codewords can be restored), Q (quartile, 25% of codewords can be restored), and H (high, 30% of codewords can be restored).

The amount of data that can be stored in the QR code 300 may depend on the data type (mode, or input character set, which can be, for example, one of numeric, alphanumeric, binary, or kanji), version (1, . . . , 40, indicating the overall dimensions of the symbol), and error correction level. For example, the maximum storage capacities occur for version 40, error correction level L.

Data and error correction (legend item 3. of FIG. 3) encodes the data contained in the QR code as codewords using, for example, Reed-Solomon error correction code. As seen in FIG. 3, the data and error correction region may include most of the area, or modules, of the QR code 300.

Required patterns (legend item 4. of FIG. 3) include position (also referred to as finder) patterns (legend item 4.1. of FIG. 3) shown as the three blocks (comprising squares, e.g., several nested squares) in the corners of the QR code at the top left, top right, and bottom left. Required patterns (legend item 4.) also may include alignment patterns (legend item 4.2.) shown as being similar to finder patterns, but smaller, and placed throughout the QR code. Alignment patterns may be used in versions 2 and higher, and the alignment pattern positions may depend on the QR code version. Corners of the squares of finder and alignment patterns may be rounded, as shown in FIGS. 1C and 2C and described further below with reference to FIG. 4B. Additional regions of the QR code may include timing patterns (legend item 4.3.) shown as a row or column of alternating light and dark modules and a quiet zone (legend item 5.).

Each module 301 may have a module size expressed as the number, M, of pixels spanning the width or diameter of the module for pixels used to render the module. Each module (e.g., module 301) of QR code 300 may belong, or be allocated, to a particular region that determines the module's functionality (e.g., version, format, data encoding, positioning and alignment), as indicated by the shadings of modules shown in FIG. 3 and the accompanying legend of FIG. 3.

Figure 4A:
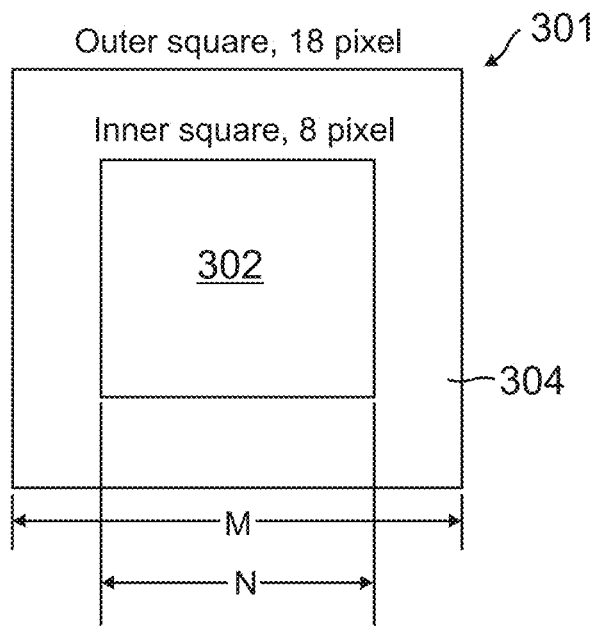
FIG. 4A is a diagram of a QR code module having an inner portion and an outer shell, in accordance with one or more embodiments.

FIG. 4A is a diagram of a QR code module (e.g., module 301) having an inner portion 302 and an outer shell portion 304, in accordance with one or more embodiments. In the example shown in FIG. 4A, the module size M is 18 pixels.

For a square module, as in the example seen in FIG. 4A, inner portion 302 may refer to the region within the inner square and outer shell portion 304 may refer to the region between the outer square and the inner square. Module 301 may be divided into an inner portion 302 and outer shell portion 304 according to an inner portion proportion, which may be, for example, input to a processor executing a method such as method 500 or method 600, or for example, a default value of inner portion proportion, which may be stored in a memory in communication with the processor, and may be used by the method for dividing module 301. For the example shown, outer shell portion 304 has size M pixels (equal to the size of module 301), and inner portion 302 has size N pixels, as shown. The size N of inner portion 302 may be determined from the size M of outer shell portion 304 and the value of the inner portion proportion as follows:

inner portion size=ceiling((inner portion proportion)× (module size)).

Thus, for the example shown with M=18 pixels, and inner portion proportion chosen to be 0.4, the inner portion size N=8 pixels as shown.

More generally, the inner portion 302 may be of any general shape (e.g., square, circle, star, regular, or irregular) and not limited to squares as in the example shown in FIG. 4A. Then, the size of the inner portion 302 may still be dependent on the size, M, of the module 301 or outer shell portion 304, but the parameters of that dependence could be defined as needed. For example, if the shape is a circle, there could be a number of ways to derive its radius from the module size M. One way may be to use an inner portion proportion as with the case of a square shape; another way, for example, may be to equate the radius of the circle to the square root of the module size M, and round (e.g., use ceiling or floor function) to the nearest number of pixels. For an example of using an inner portion proportion with a star shape, or other regular or irregular shape, a circle could be either inscribed inside or circumscribed outside the shape, then the method used for determining the radius of the circle shape from the inner portion proportion could be used for the inscribed or circumscribed circle, and then the star or other regular or irregular shape could be scaled according to the size of the inscribed or circumscribed circle.

Figure 4B:
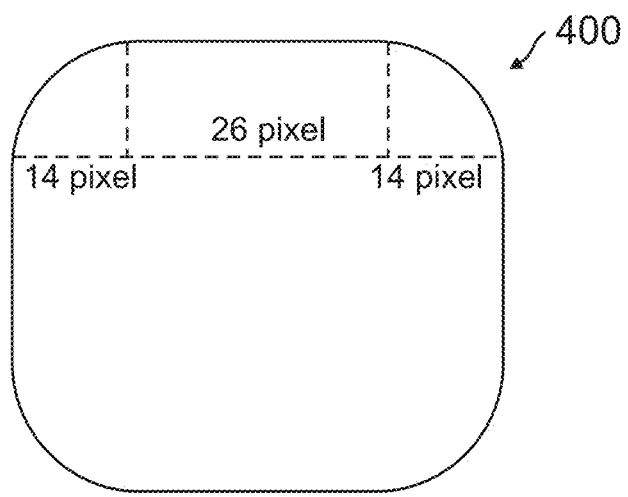
FIG. 4B is a diagram of a square with rounded corners comprising part of a region of a QR code, such as a position or alignment pattern, in accordance with one or more embodiments.

FIG. 4B is a diagram of a square with rounded corners comprising part of a region of a QR code, such as a position or alignment pattern, in accordance with one or more embodiments. As seen in FIGS. 1C and 2C, for example, the finder and alignment patterns may be comprised of modules forming squares (e.g., several nested squares) with rounded corners.

The corners of such squares (including the case of several nested squares, regardless of the size of each nested square) may be rounded according to a single roundness value which may be, for example, input to a processor executing a method such as method 500 or method 600, or for example, a default roundness value, which may be stored in a memory in communication with the processor, and may be used by the method for rounding the corners of the squares. The radius of a round corner may be determined from the number, S, of modules spanning a side of the square using the following formula:

radius=ceiling((roundness value)×(S)×(module size) ÷2).

For the example shown, the square 400 (which may be any of the several nested squares, including the outermost and innermost squares whether dark or light, of a finder pattern or an alignment pattern, for example) may be composed of 3×3 modules (S=3) of size M=18 pixels each so that square 400 may have a size of 54 pixels. Using a roundness value=0.5, for example, the above formula yields ceiling (0.5×3×18÷2)=ceiling (13.5)=14 pixels for the radius with a flat side of 26 pixels in between, as seen in FIG. 4B. For a rectangle, the vertical number of modules may be different from the horizontal number of modules and using the different values for vertical and horizontal number of modules in the same formula yields two different values which can be used as major and minor axis values for using an ellipse to round the corners of the rectangle.

Figure 5:
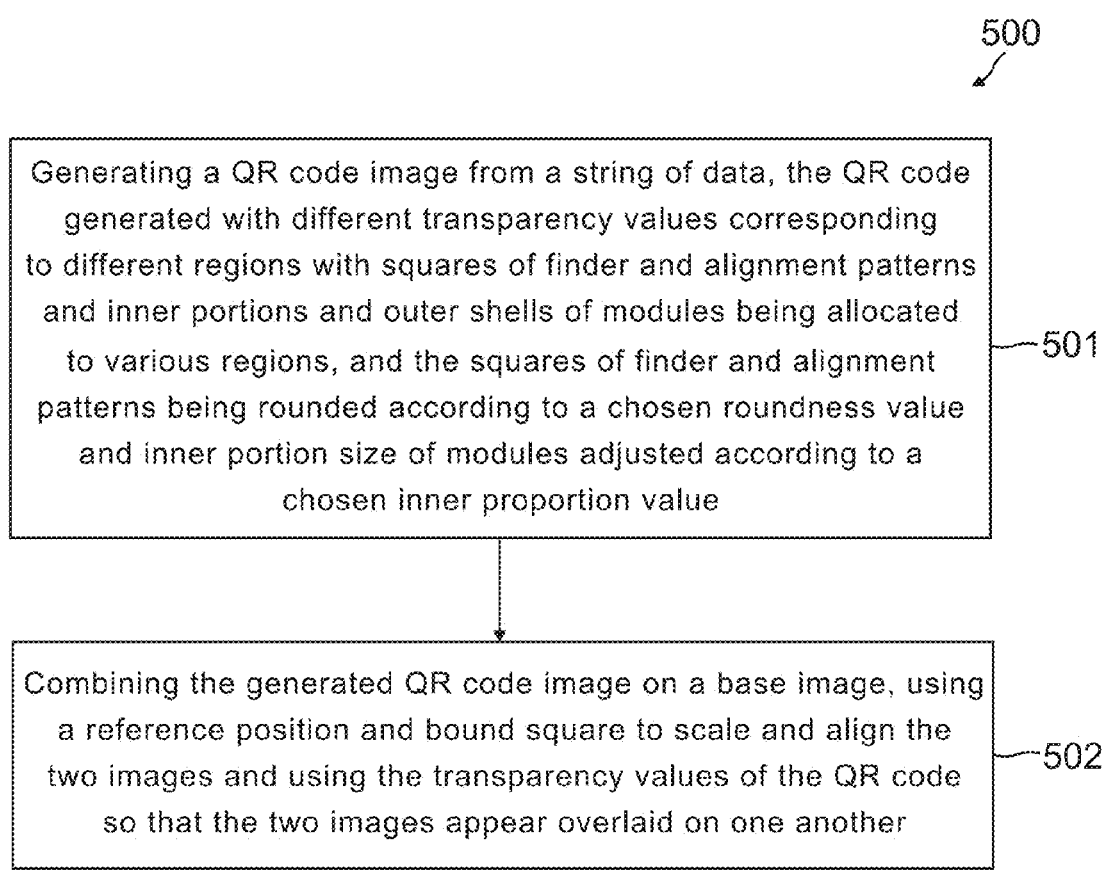
FIG. 5 is flow diagram illustrating a method for combining a QR code and an image, according to an embodiment.

FIG. 5 is flow diagram illustrating a method 500 for combining a QR code and an image, according to an embodiment. Method 500 may be generally described as proceeding in two stages.

In a first stage, process 501, a QR code (such as QR code 101 or QR code 201) may be generated for a given item or items of information, referred to as a string of data. The QR code may be generated with an optimal version and error code correction level appropriate for the string of data. The QR code may be generated with several different transparency values (which may reflect either or both of opacity and intensity values used with alpha compositing) for different regions of the QR code. The QR code may be generated with an inner portion and an outer shell for each module, with the inner portion of each module belonging to or being allocated to one of the regions and having a transparency value chosen for the region, and the outer portion of each module belonging or being allocated to another of the regions and having a transparency value chosen for that region. Squares of the finder and alignment patterns may be rounded according to a chosen roundness value. Inner portions relative to outer shell size of modules in one or more of the allocated regions may be adjusted according to an inner portion proportion value.

In a second stage, process 502, the generated QR code image (e.g., QR code 101 or QR code 201, see FIGS. 1C, 2C) from process 501 may be combined with a given base image such as a face or company logo (e.g., facial image 102 or company logo 202, see FIGS. 1C, 2C) using the transparency values of the QR code image from process 501 to make the two images appear as overlaid on one another with varying degrees of transparency. For example, as seen in FIGS. 1C, 2C, modules of the finder and alignment pattern squares (e.g., any of a multiple of nested squares) may appear less transparent than, for example, modules of the data encoding regions; and the inner portions and outer shell portions of modules not in the finder and alignment patterns may have different transparencies that enhance viewing of the base image. Also, as can be seen in FIGS. 1C, 2C, squares (e.g., any of the multiple nested squares) of the finder and alignment patterns may have rounded corners. In one or more embodiments combining of the QR code image and the base image may be implemented using alpha compositing with the transparency values used as opacity and intensity inputs for an alpha compositing process.

In one or more embodiments, the base image (e.g., base image 102 seen in FIG. 1C, or base image 202 seen in FIG. 2C) may appear to form the background of the resulting combined QR code-base image (e.g., combined QR code-base image 100 or combined QR code-base image 200), and the generated QR code image (e.g., QR code image 101 or QR code image 201) may appear to form the foreground.

Figure 6:
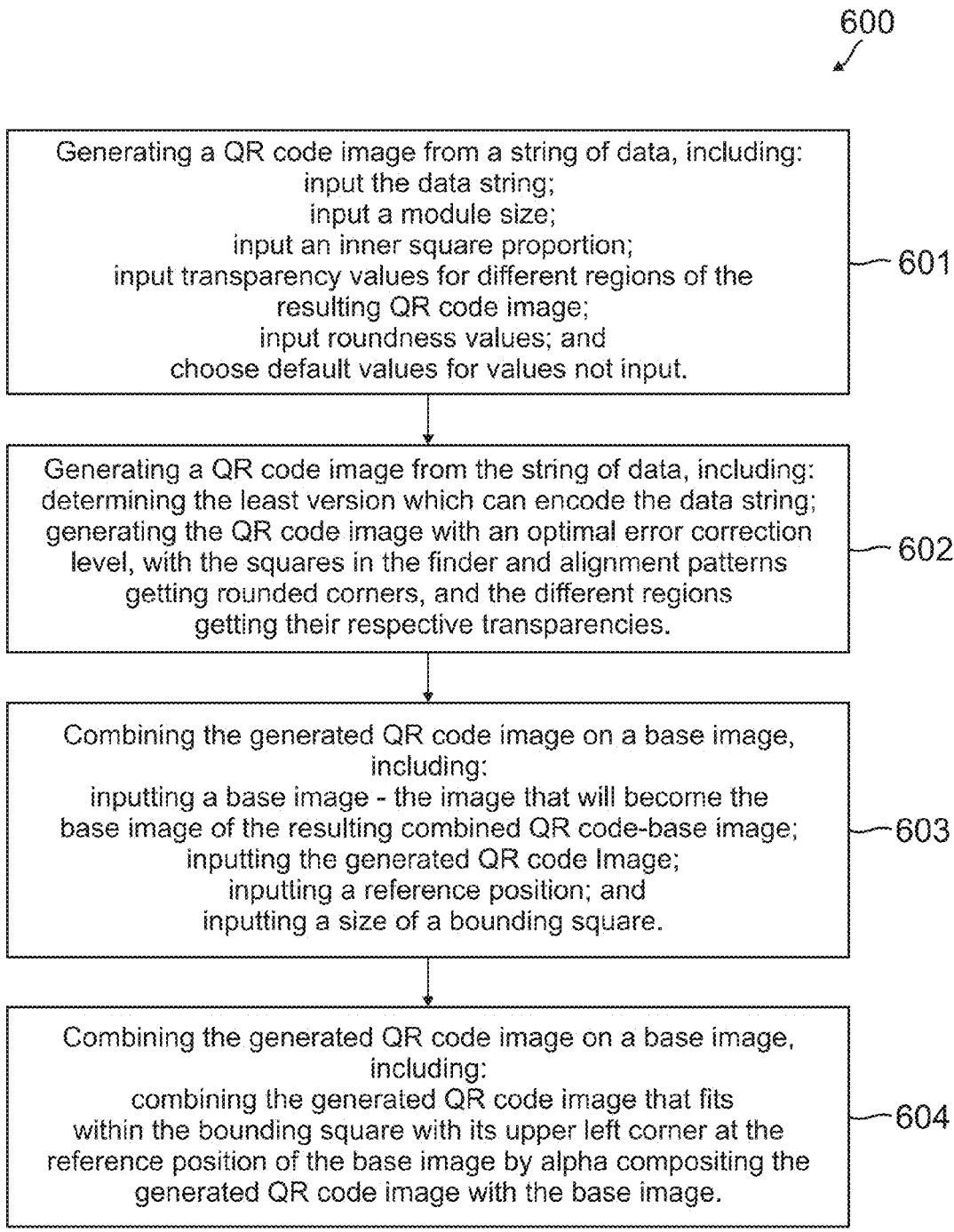
FIG. 6 is a more detailed flow diagram illustrating a method for combining a QR code and an image, according to an embodiment.

FIG. 6 is a flow diagram illustrating a method 600 for combining a QR code and an image, according to one or more embodiments. In general, method 600 may be described as including operations of a first stage (e.g., process 501) in which a QR code image is generated from some information or data, generally referred to as a character or data string, and operations of a second stage (e.g., process 502) in which the generated QR code image is combined with a base image, for example, by alpha compositing the QR code image with the base image.

The resulting combined QR code-base image (e.g., image 100, 200, see FIGS. 1C, 2C) may be perceived as a double image with the base image (e.g., image 102, 202) being in the background and the generated QR code image (e.g., image 101, 201) being in the foreground with enough transparency to be able to see the background, base image.

The generated QR code image may be transparent, and various regions of the generated QR code image can have different transparency values. Also, various squares (e.g., squares comprising modules of finder and alignment patterns) of the generated QR code image can have rounded corners, as may be seen in FIGS. 1C and 2C.

At process 601, method 600 may include operations for generating a QR code image from a string of data, including: inputting the data string; inputting a module size, e.g. number of pixels per side of each module; inputting an inner portion proportion; and inputting transparency values for various regions (each region having specific modules of the QR code being allocated to it) of the resulting QR code image to be generated; inputting roundness values; and choosing default values for values that have not been input. The resulting QR code image may be divided, for example, into four regions: (a) the finder and alignment patterns after their squares have been rounded (e.g., modified finder and alignment patterns); (b) modules along the perimeter of the QR code image that are not in the unmodified finder and alignment patterns (e.g., the quiet zone shown in FIG. 3); (c) inner portions of modules that are not in the unmodified finder and alignment patterns and that are not along the perimeter (quiet zone) of the QR code image; and (d) the remaining areas, which may include, for example, outer shell portions of modules that are not in the unmodified finder and alignment patterns and that are not along the perimeter (quiet zone) of the QR code image, and portions of the unmodified finder and alignment patterns that are not in the modified finder and alignment patterns.

The various inputs may have various respective default values. For example, the module size, the size (e.g., length) in pixels of each module of the generated QR code, may have a default value of 10. The inner portion proportion, as described with reference to FIG. 4A, may range between 0 and 1, and may have a default value of 0.4. Transparency values for regions (a), (b), (c), and (d), may be denoted as alpha 1, alpha 2, alpha 3, and alpha 4, respectively, and each transparency value may be chosen from a range between 0 and 1. Alpha 1 for region (a) may have a default transparency value of 0.6; alpha 2 for region (b) may have a default transparency value of 0.0; alpha 3 for region (c) may have a default transparency value of 0.4; and alpha 4 for region (d) may have a default transparency value of 0.0. The roundness value, as described with reference to FIG. 4B, may range between 0 and 1, and may have a default value of 0.25.

At process 602, method 600 may include operations for generating a QR code image from a string of data, including: determining the least QR coding version which can encode (e.g., contain the entire information of) the data string; and generating the QR code image with an optimal (e.g., highest possible) error correction level, with the squares in the finder and alignment patterns (region (a)) getting rounded corners, and the regions (a), (b), (c), and (d) getting their respective transparencies. The version of the QR code to be generated may be determined as the least version which can hold the string of data. The QR code image may be generated with the highest error correction level possible for the chosen version, with squares in the finder and alignment patterns getting rounded corners, and with regions (a), (b), (c), and (d) getting their respective transparency values.

At process 603, method 600 may include operations for overlaying a generated QR code image on a base image, including: inputting a base image—the image that will become the background of the resulting QR code-overlaid image; inputting the generated QR code image resulting from processes 601, 602; inputting a reference position, defined to be the pixel coordinates in the base image at which to place the upper left corner of the generated QR code image and which may default to pixel coordinates (0, 0); and inputting a size of a bounding square which has the reference position as the pixel coordinates of the bounding square's upper left corner. The generated QR code image may be placed in the bounding square as foreground.

The default size of the bounding square may be, for example, a size that allows the largest square that fits in the base image to be placed at the reference position. If the generated QR code image resulting from processes 601, 602 has a different size than the size of the bounding square, the generated QR code image may, before it is overlaid on the base image, be resealed to the size of the bounding square.

At process 604, method 600 may include operations for overlaying a generated QR code image on a base image, including: overlaying the generated QR code image (or resealed generated QR code image) that fits within the bounding square with its upper left corner at the reference position on the base image. For example, the overlaying may be accomplished by alpha compositing the generated QR code image with the base image.

Figure 7:
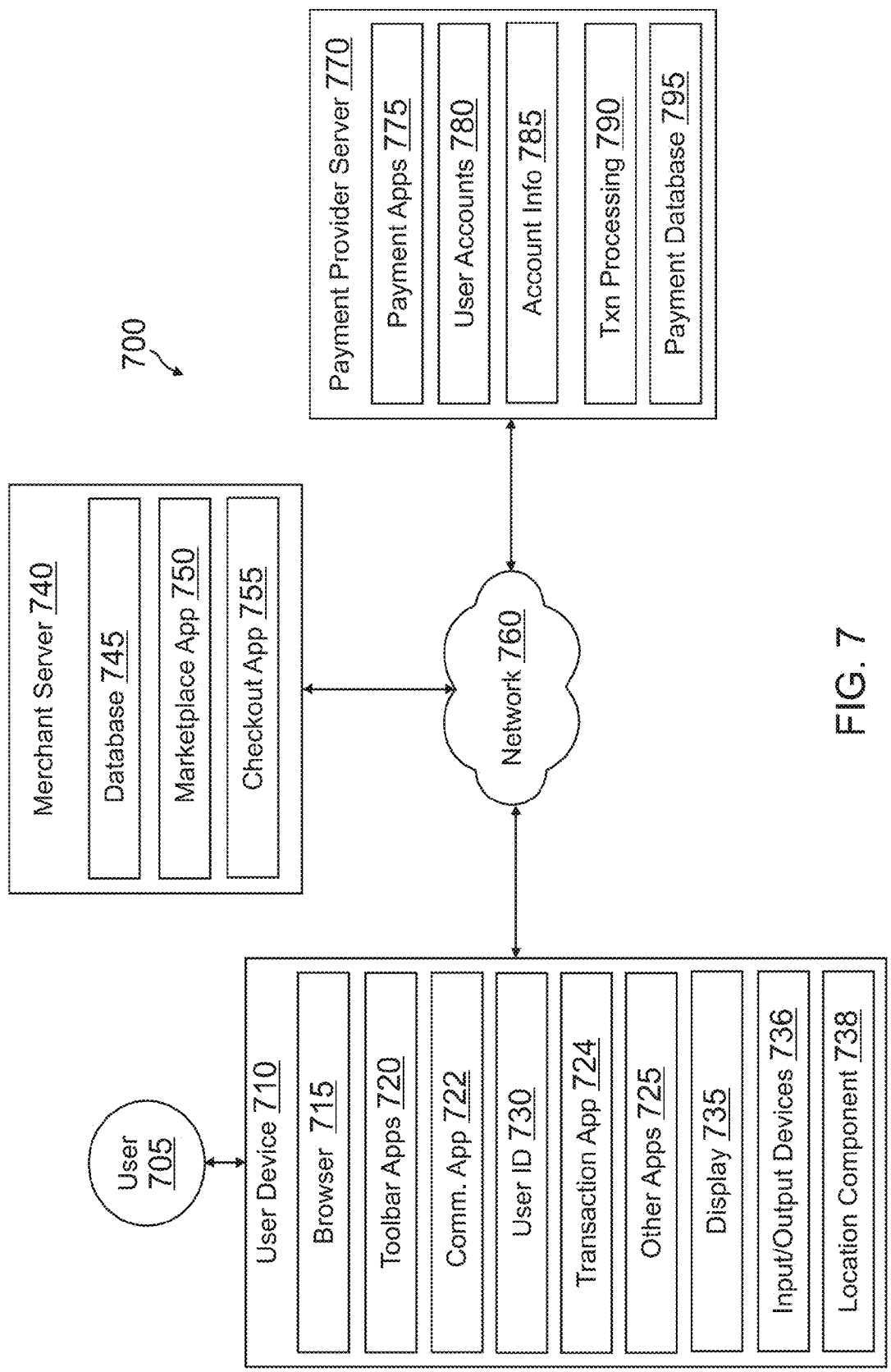
FIG. 7 is a system diagram illustrating a networked system for making and using combined QR code-base images, in accordance with one or more embodiments.

FIG. 7, is a system block diagram of a networked system 700 suitable for implementing a process for making and using combined QR code-base images according to an embodiment. Networked system 700 may comprise or implement a plurality of servers and/or software components that operate to perform various electronic commerce transactions or processes such as payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 7 may be deployed in other ways and that the operations performed and/or the services provided by such servers may be combined or separated for a given implementation and may be performed by a greater number or fewer number of servers. One or more servers may be operated and/or maintained by the same or different entities.

System 700 may include a user device 710, a merchant server 740, and a payment provider server 770 in communication over a network 760. Payment provider server 770 may be maintained by a payment service provider, such as PayPal, Inc. of San Jose, Calif. A user 705, such as a sender or consumer, utilizes user device 710 to perform a transaction such as an electronic commerce transaction using payment provider server 770. A user 705 may utilize user device 710 to initiate a payment transaction, receive a transaction approval request, or reply to the request. Note that transaction, as used herein, refers to any suitable action performed using the user device, including payments, transfer of information, display of information, purchases, sales, online listings, etc. For example, user 705 may utilize user device 710 to initiate a deposit into a savings account. Although only one merchant server is shown, a plurality of merchant servers may be utilized if the user is purchasing products or services from multiple merchants.

User device 710, merchant server 740, and payment provider server 770 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 700, and/or accessible over network 760.

Network 760 may be implemented as a single network or a combination of multiple networks. For example, in various embodiments, network 760 may include the Internet or one or more intranets, landline networks, wireless networks, and/or other appropriate types of networks.

User device 710 may be implemented using any appropriate hardware and software configured for wired and/or wireless communication over network 760. For example, in one embodiment, user device 710 may be implemented as a personal computer (PC), a smart phone, personal digital assistant (PDA), laptop computer, and/or other types of computing devices capable of transmitting and/or receiving data, such as an iPad™ from Apple™.

User device 710 may include one or more browser applications 715 which may be used, for example, to provide a convenient interface to permit user 705 to browse information available over network 760. For example, in one embodiment, browser application 715 may be implemented as a web browser configured to view information available over the Internet, such as a user account for setting up a shopping list and/or merchant sites for viewing and purchasing products and services. User device 710 may also include one or more toolbar applications 720 which may be used, for example, to provide client-side processing for performing desired tasks in response to operations selected by user 705. In one embodiment, toolbar application 720 may display a user interface in connection with browser application 715.

User device 710 may include a transaction application 724, Transaction application 724 may be used to receive product information, price information, merchant information or other information from payment provider server 770 and/or merchant server 740. Transaction application 724 may provide transaction information such as items for sale and/or payment options to display 735 for display to a user.

Transaction application 724 may receive device location information and/or device orientation information from location components 738 (e.g., a global positioning system (GPS) component, one or more accelerometers, a compass, Wi-Fi devices, Near-Field Communication (NFC) devices, etc.), The location information may include GPS coordinates, accelerometer data that indicates an orientation of the device and/or movement of the device or other data that indicates the location, position, and/or orientation of the device. User device 710 may determine a current location of user device 710 based on the collected location data. In another embodiment, user device 710 may send the location data to payment provider server 770 and payment provider server 770 may determine a current location of user device 710 based on the location data. The transaction information displayed by display 735 in response to instructions from transaction application 724 may include content that is based on the location information and/or may be displayed a time or at a location on display 735 based on the location information.

User device 710 may include one or more input/output devices 736 (e.g., a keypad, a keyboard, a touch sensitive component, or a camera). For example, input/output devices 736 may include a camera that provides images of background objects (e.g., a continuous video stream of a scene in the field of view of the camera) to transaction application 724 that can be displayed on display 735 with transaction information overlaid on the camera images.

User device 710 may further include other applications 725 as may be desired in particular embodiments to provide desired features to user device 710. For example, other applications 725 may include security applications for implementing client-side security features, programmatic client applications for interfacing with appropriate application programming interfaces (APIs) over network 760, or other types of applications.

Applications 725 may also include email, texting, voice and IM applications that allow user 705 to send and receive emails, calls, and texts through network 760, as well as applications that enable the user to communicate, transfer information, make payments, and otherwise utilize a smart wallet through the payment provider as discussed above. User device 710 may include one or more user identifiers 730 which may be implemented, for example, as operating system registry entries, cookies associated with browser application 715, identifiers associated with hardware of user device 710, or other appropriate identifiers, such as used for payment/user/device authentication. In one embodiment, user identifier 730 may be used by a payment service provider to associate user 705 with a particular account maintained by the payment provider. A communications application 722, with associated interfaces, enables user device 710 to communicate within system 700.

Display 735 may include a touch screen that displays information to user 705 and receives user input from user 705 or display 735 may be a touch insensitive display. Display 735 may be a mobile device display, a projection display that projects images onto a transparent, partially transparent or opaque structure, or may include any other suitable display technology. User device 710 may monitor user input on the touch screen, on any other touch-sensitive device (e.g., a touchpad on a laptop), or using other input components (e.g., a mouse) and may recognize user input for association with transactions, and/or to activate certain functions (e.g., purchase transactions, payment transactions, sales transactions, and listing transactions) based on the displayed transaction information.

Merchant server 740 may be maintained, for example, by a merchant or seller offering various products and/or services. The merchant may have a physical point-of-sale (POS) store front. The merchant may be a participating merchant who has a merchant account with the payment service provider. Merchant server 740 may be used for POS or online purchases and transactions. Generally, merchant server 740 may be maintained by anyone or any entity that receives money, which includes charities as well as banks and retailers. For example, a payment may be a donation to charity or a deposit to a bank account such as a savings account.

Merchant server 740 may include a database 745 identifying available products (including digital goods) and/or services (e.g., collectively referred to as items) which may be made available for viewing and purchase by user 705. Accordingly, merchant server 740 also may include a marketplace application 750 which may be configured to serve information over network 760 to browser 715 of user device 710. In one embodiment, user 705 may interact with marketplace application 750 through browser applications over network 760 in order to view various products, food items, or services identified in database 745.

Merchant server 740 also may include a checkout application 755 which may be configured to facilitate the purchase by user 705 of goods or services online or at a physical POS or store front. Checkout application 755 may be configured to accept payment information from or on behalf of user 705 through payment service provider server 770 over network 760. For example, checkout application 755 may receive and process a payment confirmation from payment service provider server 770, as well as transmit transaction information to the payment provider and receive information from the payment provider (e.g., a transaction ID). Checkout application 755 may be configured to receive payment via a plurality of payment methods including cash, credit cards, debit cards, checks, money orders, or the like.

Payment provider server 770 may be maintained, for example, by an online payment service provider which may provide payment between user 705 and the operator of merchant server 740. In this regard, payment provider server 770 includes one or more payment applications 775 which may be configured to interact with user device 710 and/or merchant server 740 over network 760 to facilitate the purchase of goods or services, communicate/display information, and send payments by user 705 of user device 710.

Payment provider server 770 also maintains a plurality of user accounts 780, each of which may include account information 785 associated with consumers, merchants, and funding sources, such as banks or credit card companies. For example, account information 785 may include private financial information of users of devices such as account numbers, passwords, device identifiers, user names, phone numbers, credit card information, bank information, or other financial information which may be used to facilitate online transactions by user 705. Payment application 775 may be configured to interact with merchant server 740 on behalf of user 705 during a transaction with checkout application 755 to track and manage purchases made by users and which and when funding sources are used. Payment application 775 may be configured to determine the existence of and to manage accounts for user 705, as well as create new accounts if necessary. Payment application 775 may be configured to execute one or more payment transactions in response to receiving and recognizing a drawn pattern from user 705.

A transaction processing application 790, which may be part of payment application 775 or may be separate from application 775, may be configured to receive information from user device 710 and/or merchant server 740 for processing and storage in a payment database 795. Transaction processing application 790 may include one or more applications for processing information from user 705 for processing an order and for payment using various selected funding instruments, including operations for initial purchase and for payment after purchase as described herein. As such, transaction processing application 790 may store details of an order from individual users, including a funding source used, available credit options, etc. Transaction processing application 790 may be configured to execute one or more transactions such as electronic commerce transactions in response to selection of a transaction option in a transaction display from user 705.

One or more of merchant server 740, payment provider server 770, and user device 710 may be used to execute any suitable transaction in response to receiving transaction instructions from a user 705.

Figure 8:
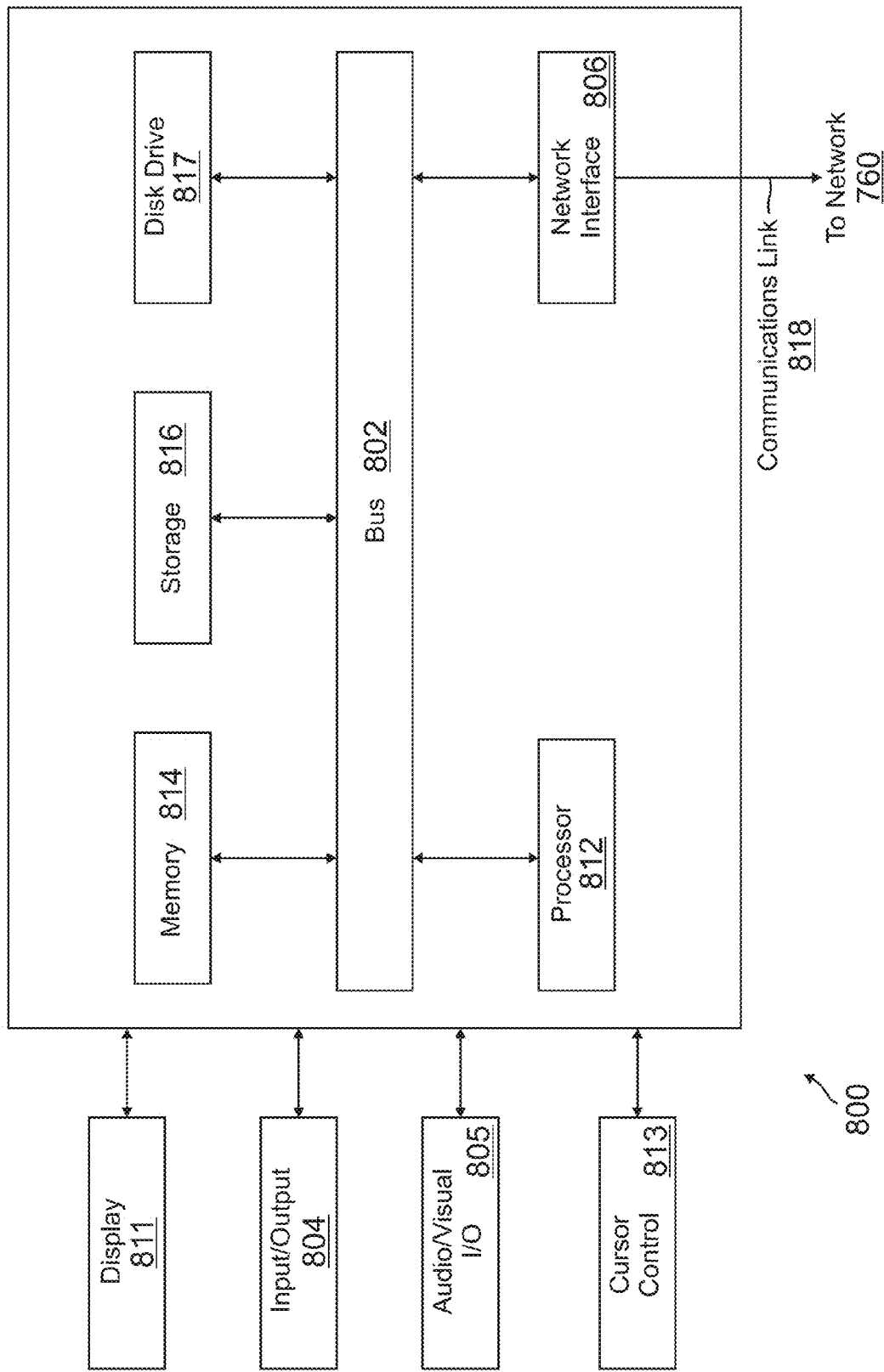
FIG. 8 is a block diagram of an example of a computer system suitable for implementing on one or more devices of the networked system in FIG. 7, according to an embodiment.

FIG. 8 is a block diagram of an example of a computer system 800 suitable for implementing on one or more devices of the networked system in FIG. 7, according to one or more embodiments. In various implementations, the user device may comprise a personal computing device (e.g., smart phone, a computing tablet, a personal computer, laptop, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 800 in a manner as follows.

Computer system 800 includes a bus 802 or other communication mechanism for communicating information data, signals, and information between various components of computer system 800. Components include an input/output (I/O) component 804 that processes a user action, such as selecting keys from a keypad/keyboard, selecting one or more buttons or links, etc., and sends a corresponding signal to bus 802. I/O component 804 may also include an output component, such as a display 811 and a cursor control 813 (such as a keyboard, keypad, mouse, etc.). An optional audio input/output component 805 may also be included to allow a user to use voice for inputting information by converting audio signals. Audio I/O component 805 may allow the user to hear audio. A transceiver or network interface 806 transmits and receives signals between computer system 800 and other devices, such as another user device, a merchant server, or a payment provider server via network 160. In one embodiment, the transmission is wireless, although other transmission mediums and methods may also be suitable. A processor 812, which can be a microcontroller, digital signal processor (DSP), or other processing component, processes these various signals, such as for display on computer system 800 or transmission to other devices via a communication link 818. Processor 812 may also control transmission of information, such as cookies or IP addresses, to other devices.

Components of computer system 800 also include a system memory component 814 (e.g., RAM), a static storage component 816 (e.g., ROM), and/or a disk drive 817. Computer system 800 performs specific operations by processor 812 and other components by executing one or more sequences of instructions contained in system memory component 814. Logic may be encoded in a computer readable medium, which may refer to any medium that participates in providing instructions to processor 812 for execution. Such a medium may take many forms, including but not limited to, non-volatile media, volatile media, and transmission media. In various implementations, non-volatile media includes optical or magnetic disks, volatile media includes dynamic memory, such as system memory component 814, and transmission media includes coaxial cables, copper wire, and fiber optics, including wires that comprise bus 802. In one embodiment, the logic is encoded in a non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 800. In various other embodiments of the present disclosure, a plurality of computer systems 800 coupled by communication link 818 to the network (e.g., such as a LAN, WLAN, PSTN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a processor; and
a data storage device including a computer-readable medium having computer readable code for instructing the processor that, when executed by the processor, causes the processor to perform operations comprising:
generating a QR code comprising plurality of modules, each module containing at least one of a plurality of pixels;
dividing the plurality of modules of the QR code among a plurality of regions;
for modules of a first region, setting a first transparency value for pixels contained in those modules;
for modules of a second region, dividing each module into an inner portion and an outer shell portion, setting a second transparency value for pixels contained in the inner portion, and setting a third transparency value for pixels contained in the outer shell portion, wherein dividing each module of the second region into an inner portion and an outer shell portion comprises:
determining an inner portion size (in pixels) of each module based on a module size (in pixels) of the module as: inner portion size=ceiling((inner portion proportion)×(module size)), wherein the inner portion proportion comprises a default value stored in the data storage device and/or is inputted from a device in communication with the processor; and
combining the QR code and an image pixel-by-pixel using alpha-compositing according to the transparency value set for each pixel.

2. The system of claim 1, wherein:
the first region comprises squares of a finder pattern or an alignment pattern;
the modules of the first region are modules included in a square of the finder pattern or the alignment pattern; and
a corner of at least one square of the finder pattern and the alignment pattern is rounded.

3. The system of claim 1, further comprising a default value for a roundness value stored in the data storage device, and wherein:
the first region comprises squares of a finder pattern or an alignment pattern;
the modules of the first region are modules included in the squares of the finder pattern or the alignment pattern; and
a corner of a square of the finder pattern or the alignment pattern is rounded using the default roundness value for determining a radius (in pixels) of a corner circle for rounding the corner of the square based on a number, S, of modules spanning a side of the square and a module size (in pixels) of each module as:

$$\text{radius}=\text{ceiling}((\text{default roundness value})\times(S)\times(\text{module size})\div 2).$$

4. The system of claim 1, wherein:
the first transparency value is for pixels of modules of the first region comprising squares of a finder pattern or an alignment pattern;
the second transparency value for pixels of modules of the second region comprising inner portions of modules not in a finder pattern or an alignment pattern; and
the third transparency value is for pixels of modules of the second region comprising outer shell portions of modules not in a finder pattern or an alignment pattern.

5. The system of claim 1, wherein:
the first transparency value is for pixels of modules of the first region comprising squares of a finder pattern or an alignment pattern;
the second transparency value for pixels of modules of the second region comprising inner portions of modules not in a finder pattern or an alignment pattern;
the third transparency value is for pixels of modules of the second region comprising outer shell portions of modules not in a finder pattern or an alignment pattern; and
the third transparency value is zero.

6. A method for overlaying a QR code and an image, comprising:
generating a QR code comprising a plurality of modules, each module containing at least one of plurality of pixels;

allocating each module of the QR code to one of a plurality of regions;

for modules allocated to a first region, setting a first transparency value for pixels contained in those modules;

for modules allocated to a second region, dividing the module into an inner portion and an outer shell portion, setting a second transparency value for pixels contained in the inner portion, and setting a third transparency value for pixels contained in the outer shell portion, wherein dividing a module into an inner portion and an outer shell portion comprises:

determining an inner portion size (in pixels) of each module based on a module size (in pixels) of the module as: inner portion size=ceiling((inner portion proportion)×(module size)), wherein the inner portion proportion is inputted and/or comprises a default value of approximately 0.4 and between 0.3 and 0.5; and overlaying the QR code and the image pixel-by-pixel using alpha-compositing according to the transparency value set for each pixel.

7. The method of claim 6, wherein:
the first region comprises squares of a finder pattern or an alignment pattern;
the modules allocated to the first region are modules included in the finder pattern or the alignment pattern; and further comprising:
rounding the corners of the squares in the first region.

8. The method of claim 6, wherein:
the first region comprises squares of a finder pattern or an alignment pattern;
the modules allocated to the first region are modules included in the finder pattern or the alignment pattern; and further comprising:
rounding the corners of the squares in the first region using a default roundness value of approximately 0.25 and between 0.2 and 0.3; and
determining a radius (in pixels) of a corner circle for rounding the corners of the squares based on a number, S, of modules spanning a side of each square and a module size (in pixels) of each module as:

radius=ceiling((default roundness value)×(*S*)×(module size)÷2).

9. The method of claim 6, wherein:
the first transparency value is for pixels of modules allocated to the first region and comprising squares of a finder pattern or an alignment pattern;
the second transparency value for pixels of modules allocated to the second region and comprising inner portions of modules not in a finder pattern or an alignment pattern; and
the third transparency value is for pixels of modules allocated to the second region and comprising outer shell portions of modules not in a finder pattern or an alignment pattern.

10. The method of claim 6, wherein:
the first transparency value is for pixels of modules allocated to the first region and comprising squares of a finder pattern or an alignment pattern;
the second transparency value for pixels of modules allocated to the second region and comprising inner portions of modules not in a finder pattern or an alignment pattern;

the third transparency value is for pixels of modules allocated to the second region and comprising outer shell portions of modules not in a finder pattern or an alignment pattern;
the first transparency value is approximately 0.6 and between 0.5 and 0.7;
the second transparency value is approximately 0.4 and between 0.3 and 0.5; and
the third transparency value is approximately 0.0 and between 0.0 and 0.1.

11. A non-transitory computer-readable medium comprising instructions which, in response to execution by a computer system, cause the computer system to perform a method comprising:
generating a QR code comprising a plurality of modules, each module containing at least one of a plurality of pixels;
allocating each module of the QR code to one of a plurality of regions;
for modules allocated to a first region, setting a first transparency value for pixels contained in those modules;
for modules allocated to a second region; dividing the module into an inner portion and an outer shell portion, setting a second transparency value for pixels contained in the inner portion, and setting a third transparency value for pixels contained in the outer shell portion;
determining an inner portion size (in pixels) of each module based on a module size (in pixels) of the module as: inner portion size=ceiling((inner portion proportion)×(module size)), wherein the inner portion size is inputted and/or comprises a default value of approximately 0.4 and between 0.3 and 0.5; and
overlaying the QR code and the image pixel-by-pixel using alpha-compositing according to the transparency value set for each pixel.

12. The computer-readable medium of claim 11, wherein:
the first region comprises squares of a finder pattern or an alignment pattern;
the modules allocated to the first region are modules included in the finder pattern or the alignment pattern; and the method further comprises:
rounding the corners of the squares in the first region.

13. The computer-readable medium of claim 11, wherein:
the first region comprises squares of a finder pattern or an alignment pattern;
the modules allocated to the first region are modules included in the finder pattern or the alignment pattern; and the method further comprises:
rounding the corners of the squares in the first region using a default roundness value of approximately 0.25 and between 0.2 and 0.3; and
determining a radius (in pixels) of a corner circle for rounding the corners of the squares based on a number, S, of modules spanning a side of each square and a module size (in pixels) of each module as:

radius=ceiling((default roundness value)×(*S*)×(module size)÷2).

14. The computer-readable medium of claim 11, wherein:
the first transparency value is for pixels of modules allocated to the first region and comprising squares of a finder pattern or an alignment pattern;
the second transparency value for pixels of modules allocated to the second region and comprising inner portions of modules not in a finder pattern or an alignment pattern; and the third transparency value is for pixels of modules allocated to the second region and comprising outer shell portions of modules not in a finder pattern or an alignment pattern.

* * * * *